APPARATUS FOR MOUNTING INSERTS IN CARDS

Original Filed Nov. 8, 1956 5 Sheets-Sheet 1

INVENTORS
STANLEY T. STOOTHOFF
WILLIAM W. STOOTHOFF

BY Bauer & Seymour

ATTORNEYS

APPARATUS FOR MOUNTING INSERTS IN CARDS

Original Filed Nov. 8, 1956 5 Sheets-Sheet 2

INVENTORS
STANLEY T. STOOTHOFF
WILLIAM W. STOOTHOFF
BY
Bauer & Seymour
ATTORNEYS

APPARATUS FOR MOUNTING INSERTS IN CARDS

Original Filed Nov. 8, 1956 5 Sheets-Sheet 3

INVENTORS
STANLEY T. STOOTHOFF
WILLIAM W. STOOTHOFF

BY Bauer & Seymour
ATTORNEYS

APPARATUS FOR MOUNTING INSERTS IN CARDS

Original Filed Nov. 8, 1956 5 Sheets-Sheet 4

INVENTORS
STANLEY T. STOOTHOFF
WILLIAM W. STOOTHOFF
BY
Bauer & Seymour
ATTORNEYS Jan. 5, 1965 S. T. STOOTHOFF ET AL 3,164,510

APPARATUS FOR MOUNTING INSERTS IN CARDS

Original Filed Nov. 8, 1956 5 Sheets-Sheet 5

INVENTORS
STANLEY T. STOOTHOFF
WILLIAM W. STOOTHOFF

BY Bauer & Seymour

ATTORNEYS

United States Patent Office 3,164,510
Patented Jan. 5, 1965

3,164,510

APPARATUS FOR MOUNTING INSERTS IN CARDS

Stanley T. Stoothoff, Glen Rock, and William W. Stoothoff, Ramsey, N.J., assignors to Minnesota Mining and Manufacturing Company, St. Paul, Minn., a corporation of Delaware Original application Nov. 8, 1956, Ser. No. 621,152, now Patent No. 3,034,388, dated May 15, 1962. Divided and this application Apr. 5, 1962, Ser. No. 185,375
8 Claims. (Cl. 156—514)

This invention relates to a method of an apparatus for mounting record bearing sections, such as sections of microfilm, in aperture cards.

This application is a division of application Serial No. 621,152, filed November 8, 1956, now Patent No. 3,034,388.

One of the objects of the present invention is to provide a novel method of cutting or blanking out a section of record bearing strip, such as micro-film, and for forwarding such cut section and pressing it into and securing it in an aperture in a card.

Another object of the invention is to provide novel apparatus for cutting a record bearing strip, such as micro-film, into individual sections, for forwarding such cut sections, and for mounting them in apertures in cards.

A further object of the invention is to provide novel apparatus of the above character wherein the sections to be cut from the supply strip may be viewed for selection and/or positioning purposes prior to the cutting or blanking out of such sections and the mounting of them in the apertures in the cards.

Still another object of the invention resides in the provision of improved means for guiding and locating the cards with respect to the section-cutting, forwarding, and pressing means, whereby accurate registry between the cut strip sections and the apertures in the cards is assured.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a view in plan of one form of strip section-cutting and mounting apparatus constructed in accordance with the present invention, the view showing only the strip feeding and cutting means, the card guiding means, and a portion of the projection means whereby the film sections may be viewed prior to the section-cutting and mounting operations;

Figures 1, 2:
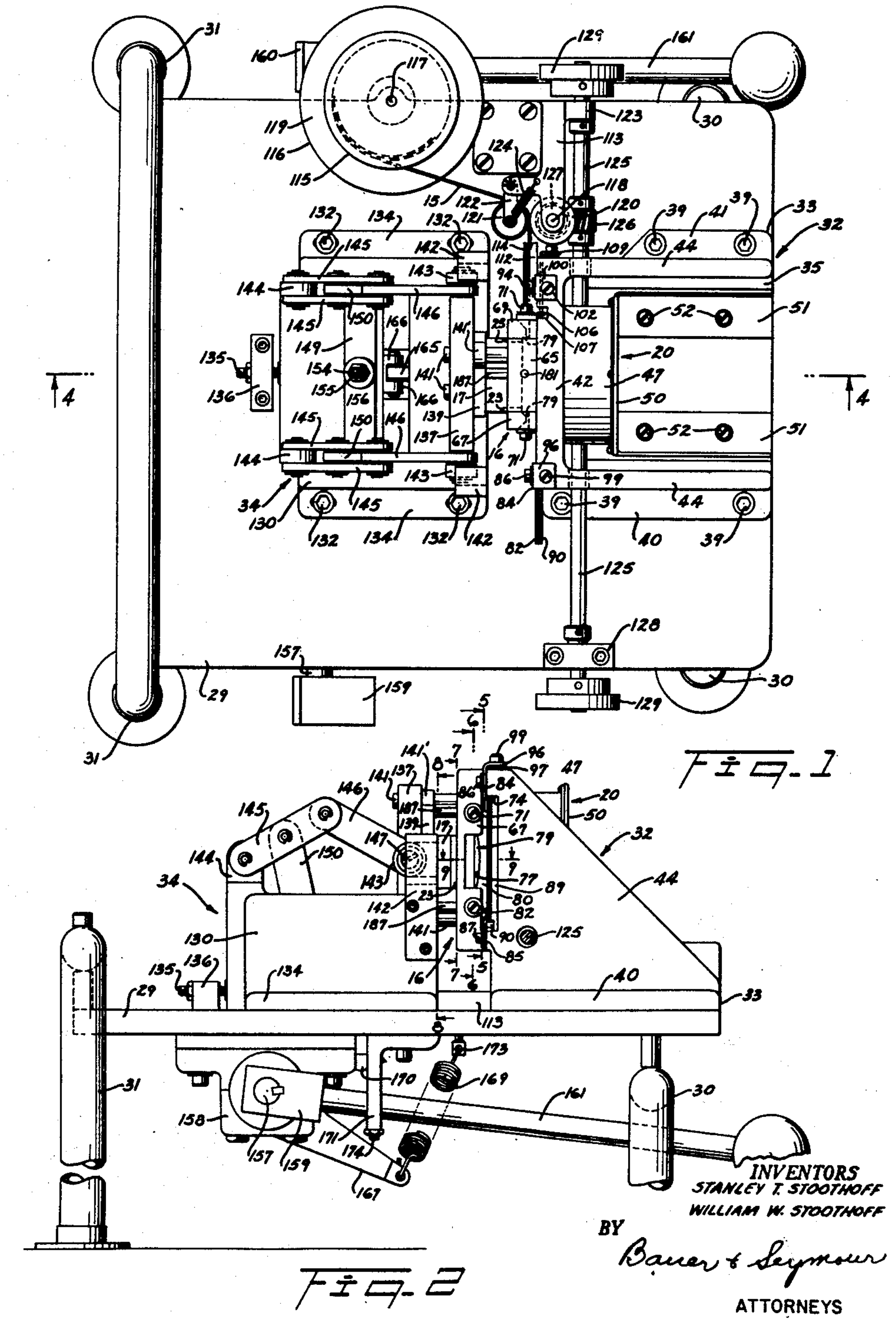
FIG. 2 is a fragmentary view in side elevation, partly in section, of the apparatus shown in FIG. 1.
Figure 6:
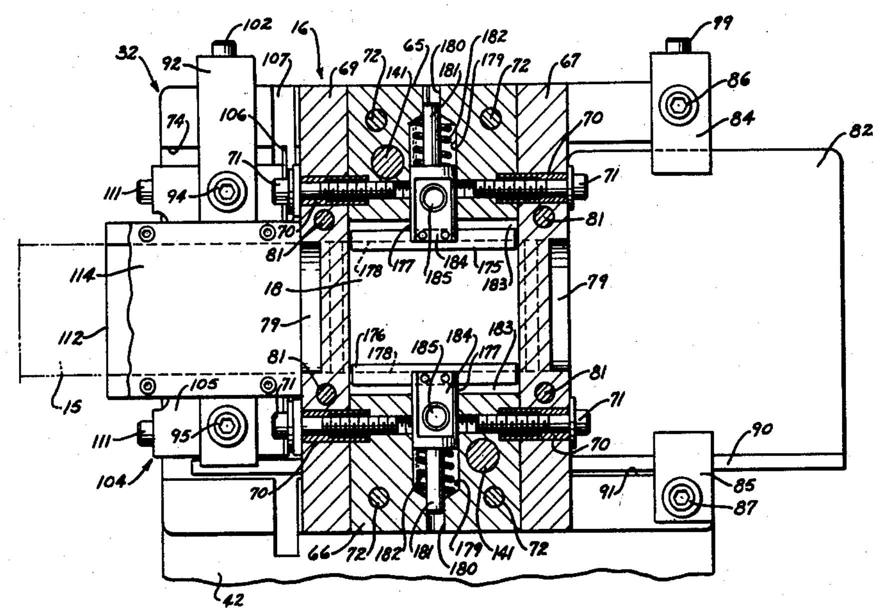
Figure 7:
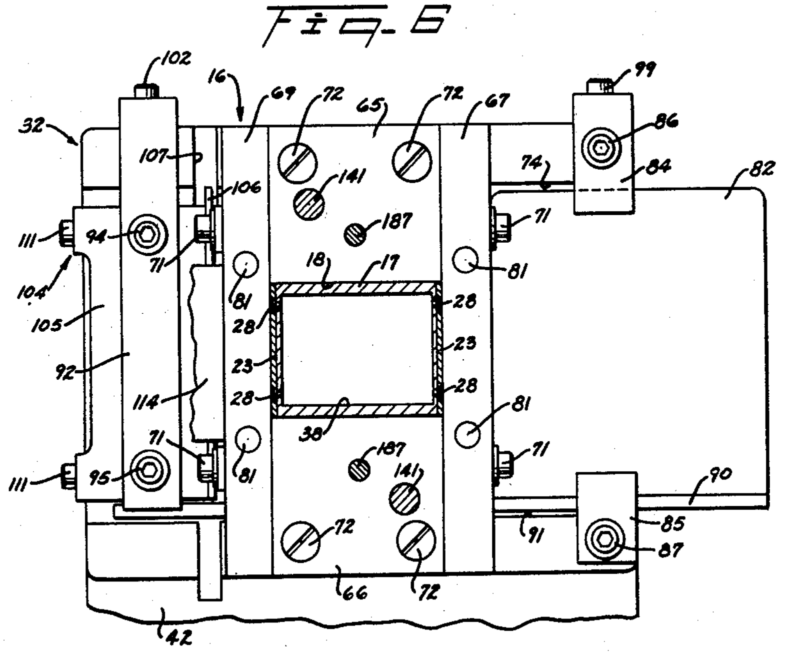
Figure 8:
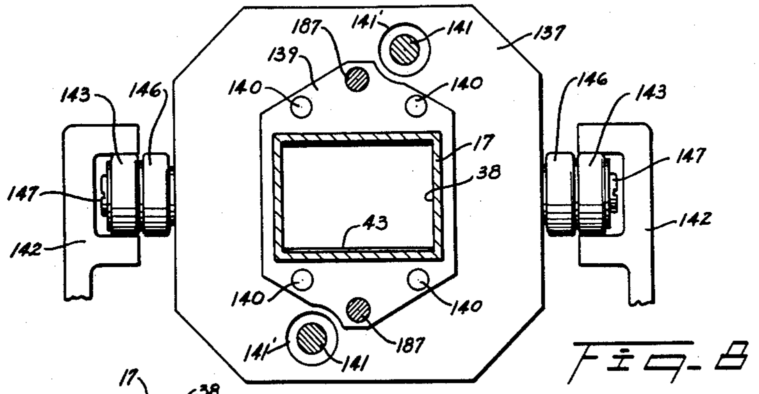
Figure 9:
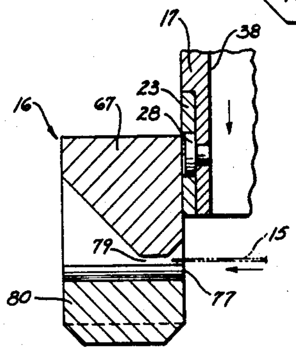
Figure 10:
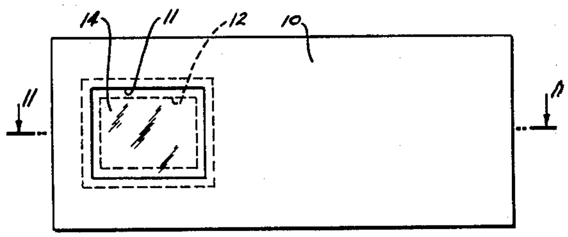
Figure 11:
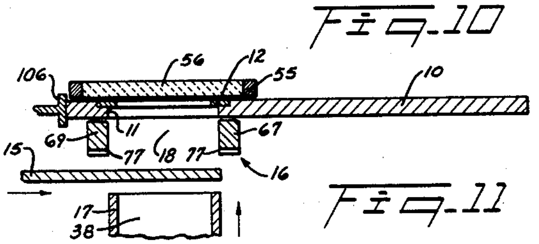
Figures 12, 13:
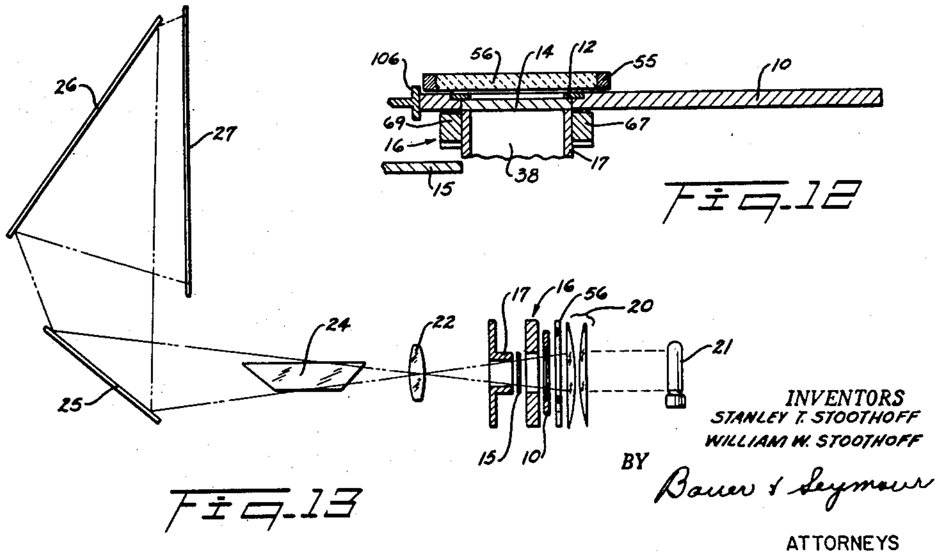

FIGS. 6, 7 and 8 are enlarged fragmentary vertical sections through the apparatus, the several views being taken along the lines 6—6, 7—7, and 8—8, respectively, of FIG. 2, certain of the parts in FIGS. 6 and 7 having portions thereof broken away for purposes of clearer illustration;

FIG. 9 is an enlarged fragmentary horizontal section through the cooperating strip cutting dies of the apparatus, the section being taken along the line 9—9 of FIG. 2;

FIG. 10 is a view in elevation of a card having a record bearing section mounted in an aperture therein;

FIG. 11 is a schematic view in horizontal section through a film strip, an apertured card, and elements of the strip-cutting and section-mounting means cooperating therewith, the elements of the apparatus, the film strip, and the card being shown in the relative positions which they occupy at the start of the cutting and mounting operation, the section through the card being taken generally along the line 11—11 of FIG. 10;

FIG. 12 is a view similar to FIG. 11, but with the film strip, the card, and the parts of the apparatus generally in the positions they occupy at the end of the film section-mounting operation; and FIG. 13 is a schematic view in longitudinal axial section through a complete film scanning, cutting and mounting system of which the apparatus shown in FIGS. 1 to 9, inclusive, may be employed as a part.

Referring now to the drawings, there is shown in FIGS. 1 to 9, inclusive, by way of example, one form of strip feeding, cutting, and mounting apparatus constructed in accordance with the present invention. Such apparatus, as will be understood after consideration of FIG. 13, is adapted to be used in a system which permits the scanning of the record bearing strip while it is being fed, and before the individual sections are cut therefrom and mounted. Such system, and the apparatus of the present invention, are particularly, although not exclusively, adapted for mounting individual sections or frames of micro-film in apertured cards of the record type commonly employed in connection with known and existing record card tabulating and sorting systems and machines. It will be understood, however, that the present invention is not limited to the mounting of film sections in the statistical or tabulating machine type of card, since other forms of record or catalogue cards, as well as ordinary cards may be used for this purpose. Additionally, apparatus in accordance with the present invention may be used to advantage for mounting record bearing and other sections, which may be transparent or translucent, or in some instances opaque, in apertured cards or card-like structures for various purposes. For simplicity the strip 15 from which the sections are severed for mounting in cards 10 is herein called "film."

For purposes of illustration only, there is shown in FIGS. 10, 11, and 12 one form of card, designated 10, which is of the statistical or tabulating machine type. In FIG. 10 the card is shown as having a rectangular aperture 11 in which there is mounted a section 14 of micro-film. As indicated in FIGS. 10 and 12, the section or frame 14 of micro-film fits accurately within aperture 11 in the card 10, and the rear surface of the film section lies substantially flush with the rear surface of the card. The film section 14 is retained in the aperture 11 by a transparent border or frame 12 which has its inner face, overlying the marginal edge of the film section 14 and the edge of the aperture, coated with a pressure sensitive adhesive. Preferably, the border 12, as herein shown by way of illustration, is embedded in the face of the card 10 so that the outer face of the border lies flush with the face of the card.

In accordance with the described embodiment of the method and apparatus of the present invention, the aperture 11 in the card 10 is made of such width, or vertical dimension as herein shown, that it accurately receives the uncut longitudinal edges of the film section 14, thereby economically utilizing the full width of the film. This requires the cutting of the film strip 15 with but one or two, two when the leading edge of the strip must be trimmed, transverse cuts extending completely across the film strip so as to provide a film section of such length as to accurately fit between the end walls of the aperture 11 in the card 10. Not only does such construction increase the useful area of the film section, but it also produces a film section-bearing card of substantially uniform thickness, since the film section does not overlie the card, whereby such card may be easily and rapidly fed edgewise without danger of catching upon other cards or upon card guiding means. It will be seen, however, that a very high degree of accuracy is required in the cutting of the film strip sections to length, and also in the registry or alignment of the cut sections with the apertures in the respective cards during the film section-mounting operation, if the operation is to be entirely satisfactory.

The method of the invention, and the general character of the apparatus of the invention, will be generally understood upon consideration of FIGS. 11, 12, and 13, which schematically depict the operation of the illustrated embodiment of the apparatus. A card 10, prepared with an aperture 11 and with an adhesively coated border 12, is positioned at the film section-mounting station of the apparatus upon a lower guide, to be described, and in abutment with an end stop 106. At such station the aperture portion of the card 10 is centered with respect to the cutting dies, and is held between the front end of the outer or female die 16 and the rear surface of a transparent anvil or backing plate 56.

The forward end of a film strip 15 is fed endwise between the rear end of female die 16 and the front end of a hollow male die or punch 17. The endwise positioning of the film strip 15 with respect to the dies 16, 17 is under the control of the operator, who is able to scan the film strip as it is fed between the dies. As shown in FIG. 13, light from a source 21 passes through a condensing lens unit 20, the anvil plate 56, the female die 16, and the male die 17, in that order. The beam of light emerging from the male die 17 passes sequentially through a lens 22 and a prism 24, being then reflected successively by mirrors 25 and 26 to fall upon the rear surface of a translucent screen 27 which faces the operator.

After the film strip 15 has been advanced into the correct position, generally in which its leading edge at least slightly overlies a second cutting edge of the female die 16 (FIG. 9), the movable male die or punch 17 is then advanced in the direction of the arrow in FIG. 11, whereby it cuts a frame or section 14 from the leading end portion of the film strip. Continued advancement of the male die 17 moves the thus cut film section 14 through the passage in the female die 16 and inserts the section into the aperture 11 in the card. Finally, at the end of its advance stroke, the male die 17 presses the marginal edges of the severed film section 14 into forcible engagement with the adhesively coated face of the portion of border 12 extending into the card aperture 11, so that the film section 14 is substantially permanently bonded to said border and mounted in the card.

Figure 3:
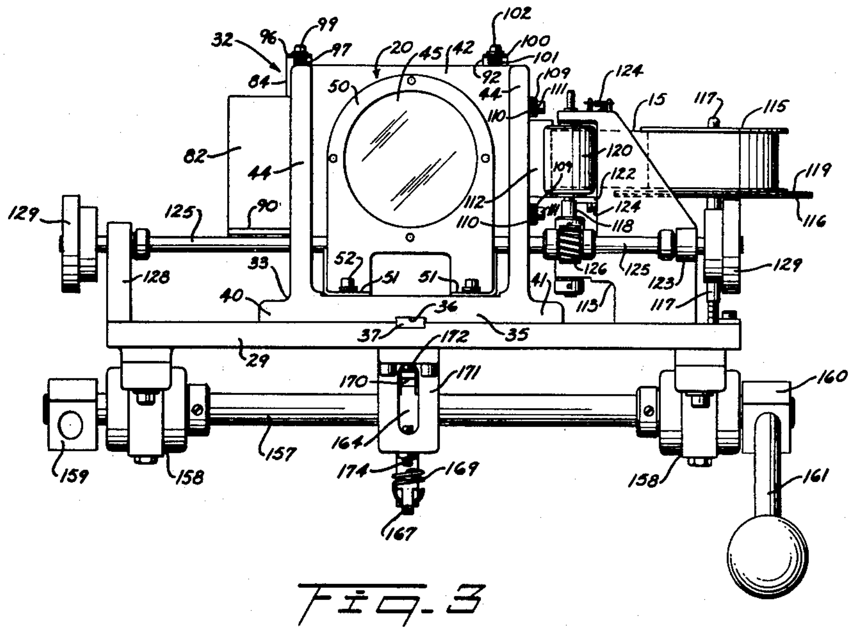
FIG. 3 is a view in front elevation of the apparatus shown in FIGS. 1 and 2, the view being taken in the direction from right to left in such prior figures.

Turning now to a detailed description of the apparatus of the invention, such apparatus has a supporting structure generally in the form of a table consisting of an upper horizontal supporting plate 29, a pair of spaced front legs 30 and a pair of spaced rear legs 31 (FIGS. 1, 2, and 3). Plate 29 carries a front assembly, generally designated 32, which confronts the operator, and a rear assembly, generally designated 34, remote from the operator and aligned with assembly 32. Assembly 32 includes the above-mentioned condensing lens set 20, and the transparent anvil plate 56, a card guide and support (to be described), the card end-stop 106, the female die 16, and guides for the film supply strip 15 (also to be described). Assembly 34 includes the male die 17, means for reciprocating and guiding the male die, and means operated by advance of the male die for retracting upper and lower movable edge guides (to be described) for the film supply strip 15, said retractable guides normally projecting into the passage through the female die 16 and being aligned with the path of travel of the film strip 15 into the apparatus.

Figure 5:
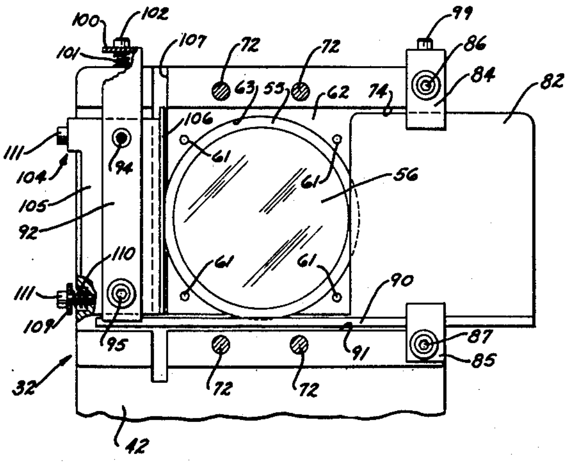
FIG. 5 is an enlarged fragmentary vertical section through the apparatus, the section being taken along the line 5—5 of FIG. 2, certain of the parts having portions thereof broken away for purposes of clearer illustration.

Assembly 32 has a main generally L-shaped support or bracket 33 having a horizontal portion 35 resting upon supporting plate 29, and a vertical transverse portion 42 (FIGS. 1, 3 and 5). Triangular side portions or webs 44 connect and mutually brace the portions 35 and 42, as shown. In order to insure accurate positioning of the bracket 33 on plate 29, the latter is provided with a longitudinally extending central groove 36 in the upper surface thereof, and slidably engaged in said groove are downwardly extending keys 37 which are affixed to the lower surface of the portion 35 of said bracket. The bracket 33 is finally secured in its accurate position against displacement by bolts 39 which extend through clearance holes in flanges 40 and 41 on said bracket and threadedly engage the plate 29.

The condenser assembly 20 (FIG. 4), which consists of a front condenser lens 45 and a rear condenser lens 46 spaced therefrom, is carried in a cylindrical can-like housing 47. The condenser lenses 45, 46 are held in spaced relationship within the housing 47 by an interposed spacer sleeve 49. The housing 47 with its contained lenses 45, 46 is mounted on the rear surface of a suitably apertured vertical plate 50 which is disposed between the triangular webs 44 of the bracket 33 and is secured in position to said bracket by bolts 52 passing through horizontal plate portions 51 which are integral with plate 50.

The front face of the vertical portion 42 of the bracket 33 has a central annular recess 54 (FIG. 4) within which is mounted the transparent anvil member or plate 56 and the supporting means therefor. The anvil member 56 is made, for example, of thick plate glass, and the supporting means for said anvil member includes a bezel ring 55 and a front retaining ring 59 to which the bezel ring is secured by screws 60. An annular resilient ring 57, made, for example, of rubber, is interposed between the forward outer annular surface of anvil member 56 and the spaced confronting surface of retaining ring member 59, whereby to cushion the anvil in the forward direction during the final strip section-mounting operation. The thus described anvil plate assembly is immovably secured within the recess 54 to the bracket portion 42 by screws 61 (FIG. 5) which extend through the outer rim portions of retaining ring 59 and of bezel ring 55 and have threaded engagement with the adjacent wall 62 of said bracket portion at recess 54, said wall having a suitable central annular opening 63 therein through which said anvil plate assembly projects. The rear edge of bezel ring 55 lies flush with the rear face of anvil plate 56, and both such surfaces lie flush with the inner, rear surface of the wall 62 which defines a rectangular recess 74 in the rear face of the bracket portion 42. Thus recess 74, the anvil member 56, and the mounting ring 55 for the latter present a flat imperforate surface for guiding cards 10, as will more fully appear. Recess 54 is made of such depth, and the condenser assembly 20 is so located, that the rear end of the condenser assembly is telescoped within the outer end of said recess and into substantial engagement with the retaining ring 59 so that substantially no light escapes laterally from between the condenser assembly and the bracket portion 42.

The female die 16, for cutting the strip 15 into individual sections, is mounted on the rear face of the bracket portion 42 coaxially of recess 54 in said bracket portion. The construction of the die 16 will be apparent upon consideration of FIGS. 4, 6, and 7. As shown in FIG. 6, the die 16 is made up of similar upper and lower sections 65, and 66, respectively, and of similar right and left side sections 67 and 69, respectively, such sections being connected together as an integral assembly. The four connecting means shown for this purpose each takes the form of a locating sleeve 70 (FIG. 6) extending inwardly through a side section into the respective upper and lower central sections and fitted to snugly engage said sections, and a machine screw 71 disposed within and extending through the sleeve and threaded into the respective central die section. Such construction facilitates the machining of the parts of the female die 16, the replacement of wearable parts thereof, and the assembling of the operable guides (to be described) cooperating with the edges of the film strip 15 in alignment with the die 16.

The thus assembled composite female die 16 is rigidly secured to the bracket portion 42 by machine screws 72 (FIGS. 6 and 7). The composite female die 16 is formed on the front side thereof with a forwardly protruding central portion 75 (FIG. 4) which extends into the recess 74 in the bracket portion 42 such that the forward face of said die portion is spaced from the rear surface of the anvil member 56 a distance which slightly exceeds the thickness of card 10, thus forming a card-receiving slot 76 between the female die 16 and the anvil member 56.

Figure 4:
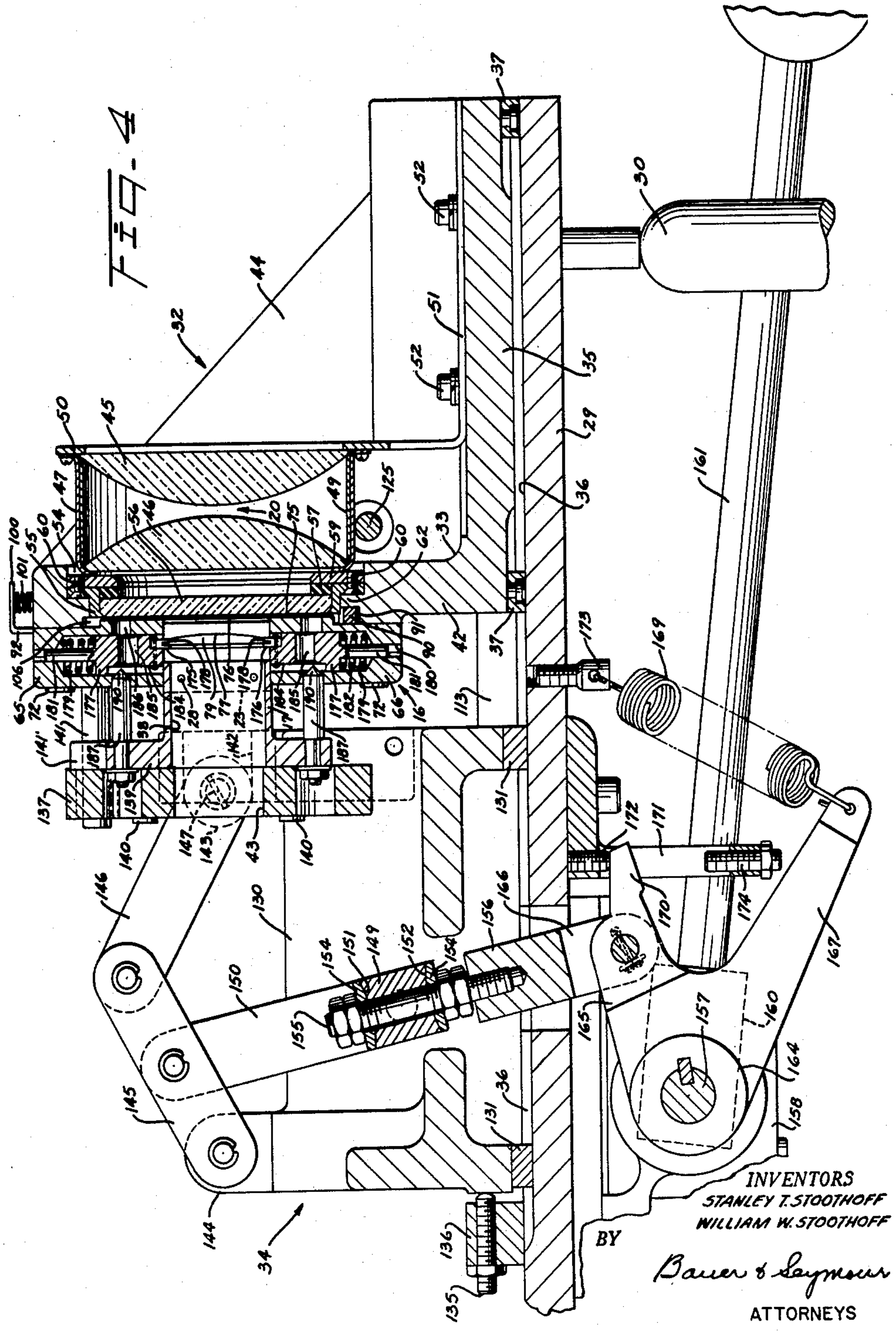
FIG. 4 is an enlarged fragmentary view in longitudinal vertical section through the apparatus, the section being taken substantially along the line 4—4 of FIG. 1, certain parts of the apparatus being shown in elevation.

The female die 16 has a passage 18 therethrough of the same size and shape as the section to be cut from the film supply strip 15, and also the same as the vertical cross-section of the male die or punch 17, said passage being defined by the lower and upper surfaces of the upper and lower die sections 65 and 66, respectively, and by the inner surfaces of the side die sections 67 and 69, and being located so that the center thereof is co-axial with the axes of the anvil plate 56 and lens unit 20. Each of the side sections 67 and 69 of die 16 has a laterally extending vertically disposed strip-receiving passage therethrough, one such passage 79 through section 67 being shown in FIG. 9. The inner edge of the forward surface of each of the laterally extending strip-receiving passages 79 is in the form of a shearing edge, such edge on the die section 67 being designated 77 (FIG. 9). As shown in FIGS. 4, 6 and 9, the forward surface of each strip-receiving passage 79, which provides the above-described shearing edge 77, is of shallow rearwardly facing concave shape and is symmetrically disposed vertically relative to the central horizontal plane therethrough. Consequently, upon cutting movement of the male die or punch 17 relative to the female die 16, the film supply strip 15 is first shearingly engaged between said dies at each of the four corners of the strip section to be cut out, the cuts then extending progressively inwardly toward the horizontal center line of such strip section upon continued movement of the die 17. In order to facilitate manufacture of each of the side sections 67 and 69, the forward portion thereof, indicated at 80 (FIG. 9), which contains the described concave shearing edge 77 is formed separately from the main body thereof and is rigidly secured to said main body as by rivets 81 (FIGS. 6 and 7).

The card 10, upon its edgewise introduction by the operator into the slot 76 between the anvil member 56 and the forward face of the female die 16 from the left-hand side of the apparatus as viewed in FIG. 3, is accurately located with the aperture 11 of the card in exact vertical and horizontal registry with the longitudinal passage 18 through die 16 by card-locating means now to be described. Turning particularly to FIGS. 5, 6, and 7, in which the card-locating means is most clearly shown, it will be seen that there is a flat vertical plate 82 which is disposed parallel to and is spaced rearwardly from the rear surface of the anvil plate 56. This plate 82 extends laterally outwardly of the bracket 33 and inwardly a short distance beyond the adjacent side of said bracket and forms, with the beveled surface 89 (FIG. 2) at the card-entering edge of the bracket portion 42, a narrow throat into which the leading edge of the card 10 is introduced. Plate 82 is supported on the bracket portion 42 by means of upper and lower hanger strips 84 and 85, respectively, which are soldered or otherwise suitably secured to the rear surface of the plate 82 so as to leave the forward surface of said plate flat and unobstructed. Upper and lower horizontal machine screws 86 and 87, respectively, which extend through somewhat enlarged holes in the hanger strips 84 and 85, respectively, and are threaded into openings in the bracket portion 42, provide for vertical adjustment of the plate 82 and for holding said plate securely in adjusted position. Soldered or otherwise suitably secured to the lower edge of plate 82 is a horizontal transverse bar or ledge 90 which has an appreciable width in a direction forwardly from said plate and is loosely received to a substantial depth in a horizontal transverse groove 91 (FIGS. 4 and 5) formed in the rear face of the bracket portion 42. The depth of the groove 91 and the width of the ledge 90 are such that said ledge extends forwardly beyond the vertical plane of the rear surface of the anvil plate 56. The plate 82 extends inwardly to substantially the adjacent side die section 67, and the ledge 90 extends between the bracket portion 42 and the female die 16 to a location laterally beyond the opposite side die section 69.

To support the free end of the ledge 90, there is provided an elongated vertical hanger strip 92 (FIGS. 5 and 7) which is soldered or otherwise suitably secured at its lower end to the rear surface of said ledge and adjacent the free end thereof. Hanger 92 provides for accurate vertical adjustment of the free end of the ledge 90 and, when clamped to the bracket portion 42 by means of machine screws 94 and 95, secures said ledge in adjusted position. The screws 94, 95 extend through enlarged openings in the hanger 92, as clearly shown with respect to screw 94 in FIG. 5, and are threaded into the bracket portion 42. Vertical adjustment of plate 82 and ledge 90, when screws 86, 87, 94, and 95 have been loosened, is effected by means located at the upper end of each of the hangers 84 and 92 and interacting with the bracket portion 42. As shown, the hanger strip 84 has a forwardly bent horizontally disposed flat finger 96 at its upper end, and a machine screw 99 extends through a clearance opening in said finger and is threaded into the bracket portion 42. A coil compression spring 97 (FIG. 3) is located between the bracket portion 42 and the finger 96 and surrounds the screw 99, so that when the screw is rotated in one direction, the hangers 84, 85, plate 82 and ledge 90 are moved downwardly by said screw in opposition to the tension of said spring, and when the screw is rotated in the opposite direction, said hangers, plate and ledge are moved upwardly by the expanding action of the spring 97. The hanger strip 92 is provided with a similar means for vertical adjustment of the same and the ledge 90, said means comprising a forwardly extending horizontal finger 100 at the upper end of said hanger strip, a machine screw 102 extending through a clearance opening in the finger and threaded into the bracket portion 42, a coil compression spring 101 (FIG. 3) disposed between said bracket portion and said finger and surrounding said screw. Because the groove 91 for the ledge 90 is substantially wider vertically than said ledge, not only is the ledge free for substantial vertical adjustment, but it may also be appreciably tipped in its plane if required to ring a card 10 supported thereon into proper position for accurate vertical registry of its aperture 11 with the passage 18 through the female die 16.

An end card-stop assembly, generally designated 104 (FIGS. 5, 6 and 7), is provided to locate each card 10 in the proper lateral position for accurate horizontal registry of its aperture 11 with the passage 18 through the female die 16 when the card has been fully inserted into the slot 76. As shown, the stop 104 has a flat body 105, made, for example, of sheet metal, which overlies the rear face of the bracket portion 42 at the side thereof opposite the card supporting and guiding plate 82. Body 105 has soldered or otherwise suitably secured to the inner edge thereof a vertically disposed ledge or bar 106 which is of an appreciable width and is loosely received to a substantial depth in a relatively wide vertical groove 107 formed in the rear face of the bracket portion 42. Ledge 106 extends forwardly and rearwardly beyond the plane of the rear surface of anvil plate 56 to generally the same extent as does ledge 90.

Body 105 of the card-stop assembly 104 is formed with two forwardly bent vertically spaced and vertically disposed flat fingers 109 which overlie and are spaced somewhat laterally from the adjacent side of the bracket portion 42 (FIGS. 1 and 5). Between each of the fingers 109 and the bracket portion 42 there is disposed a coil compression spring 110. A screw 111 extends through a clearance opening in each of the fingers 109, through spring 110, and is threaded into the bracket portion 42. As shown in FIGS. 5, 6, and 7, the above-described hanger strip 92 overlies the body 105 of the end stop 104. Accordingly, the screws 94 and 95 also extend through enlarged openings (not shown) in the body 105. When the screws 94 and 95 are loosened, the end stop 104 may, by simply turning the screws 111 in the proper direction, be adjusted laterally toward and away from the female die 16 to vertically align the ledge 106 and to bring said ledge into proper lateral position with respect to the passage 18 through said die. Thereupon, assuming, that the ledge 90 has also been properly adjusted as hereinbefore described, screws 94 and 95 are tightened, thereby clamping the end stop 104, as well as the hanger strip 92, against the bracket portion 42 to immovably hold said end stop and the ledge 90 in their proper adjusted positions.

The film strip 15 is led laterally of the female die 16 so as to pass through the passages 79 in the side sections 67 and 69 thereof rearwardly of the cutting edges 77 in such side die sections. The film strip 15 is guided accurately for presentation to upper and lower retractable guides 175 and 176 (to be described) lying generally within the passage 18 through the die 16 by a vertically disposed film strip-receiving guide channel 112 (FIGS. 1, 6 and 7) positioned laterally of said die at the entrance side thereof. Channel 112 is provided with a cover 114 secured to the edges of the channel, as shown in FIG. 6. Laterally spaced from the side of die 16 through which the film strip 15 enters, is a supporting bracket 113 (FIGS. 1 and 3) which is bolted or otherwise suitably secured to the top of the supporting plate 29. A supply reel 115 for the film strip 15 is supported on an annular plate or platform 116. To allow for vertical adjustment of the alignment of the film strip 15 as it is fed off reel 115 into the guiding channel 112, the reel supporting plate 116 is rotatably carried by a post 117 which is suitably secured in the plate 29 for vertical adjustment. To prevent over-running or coasting of the reel 115 relative to the plate 116 during the film feeding operation, the platform 116 has adhesively secured thereto an upper layer of friction material 119, such as cork, upon which the lower flange of reel 115 rests. The weight of the reel 115 and its contained supply of film strips, therefore, acting with facing 119 imposes a suitable retarding torque on the reel 115.

As shown in FIGS. 1 and 3, the film strip 15 upon leaving the reel 115 passes between pinch rolls 120 and 121, the nip of which is aligned with channel 112. Roll 120 is selectively manually driven by means to be described. Roll 121 is idle and is pivotally mounted upon the bracket 113 so as to be movable toward and away from driven roll 120. For this purpose, the idler roll 121 is journalled on and between parallel upper and lower arms 122 of a lever which is mounted on the bracket 113 for pivotal movement about a vertical axis. Coil extension springs 124 connected to the bracket 113 and to the free ends of the arms 112 constantly urges roll 121 toward roll 120, in order to maintain suitable frictional engagement between the film strip 15 and the roll 120. Preferably, when the roll 121 engages the emulsion side of the film strip 15 as in the embodiment of the apparatus shown, such roll is provided with an outer covering layer of resilient material, such as rubber.

The film feeding roll 120 is selectively rotated by the operator by means including a cross shaft 125 (FIGS. 1 and 3) rotatably mounted adjacent one end thereof in a bearing 123 on the bracket 113, and adjacent the other end thereof in a bearing in a pillow block 128 bolted or otherwise suitably secured to the plate 29. The shaft 125 extends through suitable clearance openings in the webs 44 of bracket 33 and has secured thereto a spiral gear 126 which meshes with a similar spiral gear 127 which is secured to a vertical shaft 118. The roll 120 is secured to the shaft 118 and the latter is journaled in suitable parallel upper and lower projections of the bracket 113. A shaft-turning knob 129 is secured to each end of the cross shaft 125, so that the film may be fed conveniently by the operator from either side of the apparatus. It will be apparent that the film strip 15 may be fed from the reel 115 into the lateral passages 79 and across the central passage 18 in the female die 16 to the extent required for the cutting of each successive complete frame of film, as indicated by the image of such frame projected upon the screen 27, and that, if necessary, the positioning of a complete image may be very accurately determined by turning the shaft 125 in either direction, as required, when the film frame approaches the desired ultimate, frame cutting position.

The rear assembly 34 of the apparatus has a main bracket 130 (FIGS. 1, 2 and 4) which is centrally positioned upon the plate 29 rearwardly of and in axial alignment with the previously described assembly 32. To insure accurate alignment of assembly 34 with respect to assembly 32, keys 131 are provided on the bottom surface of the bracket 130 to slidably interfit with the longitudinal groove 36 in the plate 29. The bracket 130 is secured to the plate 29 for limited longitudinal adjustment therealong by bolts 132 which extend through elongated holes in flanges 134 on said bracket and are threaded into said plate.

A cross-head 137 (FIGS. 1, 2, 4 and 8), which carries the male die or punch 17, is located at the forward end of the bracket 130 and is supported for rectilinear movement toward and away from the female die 16. The die or punch 17 is provided with a flange 139 at its rear end, such flange being secured against the forward face of cross-head 137 by bolts 140 (FIG. 8). Cross-head 137 and punch 17 are supported and accurately guided for rectilinear movement parallel to the film-frame-receiving passage 18 through the female die 16 by upper and lower horizontal guide rods 141 which extend rearwardly from and are suitably secured in the sections 65 and 66 of said die, and are slidably engaged in bushings 141' fitted in the cross-head 137, as shown in FIG. 4.

To further support and guide the cross-head 137, and to counteract that component of the thrust exerted by toggle type cross-head driving means which lies at an angle to the longitudinal common axis of the dies 16 and 17, there are provided additional guide means for said cross-head which are shown most clearly in FIG. 8. As shown, said additional guide means comprises similar spaced confronting tracks 142 which are bolted or otherwise suitably secured to the bracket 130 and are located at each side of the cross-head 137. Anti-friction rollers 143 journalled on stub shafts 147 which are suitably secured in the cross-head 137 and lie in a horizontal axial plane through the punch 17, are accurately received between the upper and lower horizontal surfaces of the tracks 142. Because the forward ends of spaced horizontal links 146 are likewise connected to the stub shafts 147, and are located immediately adjacent the rollers 143, such rollers and the tracks 142 effectively prevent the transmission to the cross-head 137 and punch 17 of all forces other than those in a horizontal plane. As a result, the cross-head 137 and the male die or punch 17 mounted thereon, are very accurately guided for rectilinear movement along the axis of the female die 16.

The upper rear corners of the bracket 130 are made in the form of spaced parallel ears 144 (FIGS. 1, 2, and 4). Pairs of similar links 145 are pivotally connected at their rear ends to the ears 144, there being one of said links at each side of each ear. The forward ends of one pair of links 145 are pivotally connected to the rear end of one of the links 146 which extends between said pair of links. The forward ends of the other pair of links 145 are pivotally connected to the rear end of the other link 146 which also extends between said pair of links. The links 145 and 146 thus form two similar toggles which, when pivoted upwardly, in the illustrated embodiment, towards and to collapsed position shown in FIG. 4, retract the punch 17 from its operative film cutting and mounting positions, and, when pivoted downwardly toward and to extended substantially horizontal position, thrust the punch 17 forward within the female die 16 in an operative stroke of a predetermined extent to thereby effectively sever a film frame 14 from the film strip 15 and mount said film frame in a card 10.

To operate the toggles 145, 146 and thus to reciprocate the male die or punch 17, there is provided an operating lever having an equalizing type of linkage interposed between it and said toggles. The linkage includes a cross bar 149 (FIGS. 1 and 4) having pivotally connected to opposite ends thereof the lower ends of spaced parallel links 150 which extend upwardly between each of the pairs of links 145 of the respective toggles and are pivotally connected to the latter links intermediate the ends thereof. The cross bar 149 is provided centrally thereof with centrally disposed upper and lower concave seats 151 and 152, respectively. Washers 154 having similarly curved surfaces are disposed in the seats 151 and 152 and engaged over the upper annular end of a threaded connecting rod 155. The described connection between rod 155 and cross bar 149 is such as to allow rocking of said cross bar as required to correct any slight misalignment of the respective pairs of links 145 so that the movement imparted by said links to the punch 17 is equal at both sides of said punch, and canting and jamming of the punch within the female die 16 is avoided.

Connecting rod 155 is adjustably secured, as shown in FIG. 4, in a block 156 having spaced ears 166 depending therefrom between which is pivotally engaged the free end of one arm 165 of a bell-crank lever 164, the other arm of which is indicated at 167. The arm 165 of bell-crank lever 164 is pivotally connected to the block 156, and said bell-crank lever is keyed to a cross shaft 157 which is rotatably supported beneath plate 29 in pillow blocks 158 secured to said plate. Outwardly of the pillow blocks 158, as best shown in FIG. 3, shaft 157 has terminal fitttings 159 (left) and 160 (right) non-rotatably secured thereto. An operating lever or handle 161 may be secured into either of terminal fittings 159 and 160, so that the film cutting and mounting apparatus may be operated by either the right or the left hand of the operator.

A yoke 171 (FIGS. 2, 3 and 4) is bolted to the bottom of plate 29 in position to receive between the parallel vertical legs thereof an extension 170 on the arm 165 of bell crank lever 164. The upper surface of extension 170 is adapted to abut against the lower end of an adjustable stud 172 threaded in the yoke 171, whereby to determine the fully retracted position of the male die or punch 17. An adjustable stud 174, threaded into the bight of the yoke 171, cooperates with the lower surface of the bell-crank-arm-extension 170 to determine the desired position of farthest advance of the male die or punch 17. A coil extension spring 169, connected to the outer end of the other arm 167 of bell crank lever 164 and to a stud 173 secured to the table 29 constantly urges the operating handle 161, the bell crank lever 164, the connecting linkage, and the toggles 145, 146 into the position shown in FIG. 4 in which the male die or punch 17 is fully retracted.

In order to facilitate accurate positioning of the rear assembly 34 along the table 29 with respect to the front assembly 32, and the anvil plate 56, there is provided an adjustable stop screw 135 which is threaded through a block 136 secured to the plate 29 and is arranged to engage the bracket 130 of said rear assembly. Upon loosening of the bolts 132 for the bracket 130, and rotation of the stop screw 135 in either direction, minute longitudinal adjustments of the rear assembly 34 may be effected. Following this, the bolts 132 are again tightened to immovably retain the rear assembly 34 in the desired longitudinally adjusted position.

The above-mentioned retractable film guides 175 and 176 associated with the female die 16 are shown most clearly in FIGS. 4 and 6. In both such figures the guides are shown in their inner, operative positions. The guides 175 and 176 proper, confront each other and each is in the form of a relatively thin and narrow elongated member which horizontally spans across substantially the entire distance between the confronting cut-defining side surfaces of the side sections 67 and 69 of the female die 16. Each guide 175 and 176 is formed with a narrow horizontal groove or slot 178 in the inwardly facing surface thereof, said groove opening outwardly through said surface and through opposite ends of said guide. The guides 175 and 176 are adapted to receive in the grooves 178 thereof the upper and lower edges, respectively, of the film strip 15 after said strip has been advanced through the fixed guide 112 and the passage 79 in the first die section 69, and as the same is advanced across the opening or passage 18 in the die 16, whereby bowing of the film strip 15 forwardly or rearwardly within the die passage 18 is prevented, and said film strip is caused to remain flat and to pass accurately and unobstructively from the passage 79 in the first die section 69, across the die passage 18 and into the passage 79 in the second die section 67. In this manner, severed film frames or sections 14 of uniform length and of the required length are always obtained. When the guides 175 and 176 are in their inner, operative vertical positions, shown in FIGS. 4 and 6, to receive the film strip 15, the bottoms of the grooves 178 therein are horizontally aligned with the upper and lower edges, respectively, of the fixed guide 112, and substantial widths of the guides 175 and 176 protrude into the die opening 18 and thus into the path of operative movement of the male die or punch 17.

The guides 175 and 176 are suitably secured centrally thereof to the inner ends of vertically aligned plungers 177 which extend vertically from said guides and are slidingly received in bores 179 formed in the central sections 65 and 66 of the female die 16. Each of the guides 175 and 176 is further guided for vertical reciprocal movement by a central pilot pin 181 which is formed integrally with the respective plunger 177 and is accurately and slidingly received in a smaller diameter bore 180 formed in the respective die section 65, 66. Each of the guides 175 and 176 is constantly urged inwardly toward the axis of the die 16 by a coil compression spring 182 surrounding the respective pin 181 and disposed between the respective plunger 177 and the outer end of the respective bore 179. Each of the guides 175 and 176 is continuously engaged in a horizontal transverse groove 183 (FIG. 6) formed in the inner surface of the respective die setcion 65, 66, whereby rotation of the guides relative to said die sections is prevented and, hence, accurate horizontal alignment thereof with the fixed guide 112 is always maintained and assured, each groove 183 being fitted to snugly, but slidably, receive the respective guide 175, 176. Inward vertical movement of the guides 175 and 176 by the springs 182 is limited through abutting engagement of the inner ends of the plungers 177 with the leading end portion of the retracted punch or male die 17, as shown in FIG. 4, such engagement effectively serving to accurately locate the guides vertically in their innermost operative positions, shown in FIG. 4, with their respective grooves 178 accurately disposed to receive the film strip 15 therein.

It is, of course, necessary to retract the guides 175 and 176 from the path of movement of the punch 17 before said punch, in its operative stroke, reaches the position of said guides. In the embodiment of the apparatus shown, such retraction of the guides 175 and 176 is automatically effected by means in the form of two pins 187, secured in the flange 139 of the punch 17, and projecting forwardly therefrom. The pins 187 cooperate with the plungers 177 of the guides 175 and 176, and each pin has a conical forward end 190 which, when the punch 17 is in its fully retracted position shown in FIG. 4, is located relatively close to but clear of its respective plunger 177. Each of the plungers 177 has a flat rear face 184 and has a pin-receiving bore 185 therethrough. The die sections 65 and 66 are each provided with a bore 186 which is axially aligned with the respective pin 187 to receive said pin. The bores 185 in the plungers 177 are so located that their axes lie inwardly of the axes of the pins 187 when the guides 175 and 176 are in their innermost operative positions shown in FIG. 4, so that when the punch 17 has been advanced to and beyond the zone of the guides 175 and 176, the guides through movement of the pins 187 into the offset bores 185 in the plungers 177, are vertically cammed and thus retracted by said pins so that the inner edges of said guides lie at least flush with the upper and lower inner surfaces of the die passage or opening 18. To facilitate entry of the pins 187 into bores 185 in plungers 177, the rear ends of said bores are chamfered, as shown in FIG. 4.

The outer side portions of the punch or male die 17, which perform the cutting operations, are preferably made separate from the main body of such die. As shown in FIGS. 7 and 9, such side portions are in the form of individual blades 23 which are recessed into the body of the punch 17 flush with the outer side surfaces of said punch. The blades 23 are removably held on the body of the punch 17 by pins 28 which are loosely received in said blades and are held in said body by a push fit, said pins in all positions of said punch being retained against accidental outward displacement by the adjacent die sections 67 and 69. Thus the active portions or blades 23 of the punch 17 may be easily and quickly removed, as for sharpening, by merely retracting the punch sufficiently to clear the die 16 without disturbing the other elements of the apparatus. When it is necessary to sharpen the edges 77 of the female die 16, as by grinding, it is only necessary to remove the die sections 67 and 69 from the machine.

The operation of the apparatus will be readily understood from the foregoing description and may be briefly summarized as follows. Assume that the lamp 21 has been illuminated, and that the film strip 15 has been drawn from the supply reel 115 and has been threaded between rolls 120 and 121 and thence into the guide 112. Also assume that a plurality of similar cards 10 are to have film sections or frames 14 mounted in them, and that the card supporting and guiding ledge 90 has been suitably adjusted to make the longitudinal center line of the apertures 11 in the cards coincide with the horizontal central plane through the aligned dies 16 and 17, and that the end stop 106 has been suitably adjusted so that when a card 10 is fully inserted into the card guide in engagement with the stop 106, the central vertical axis of the card aperture 11 coincides with the central longitudinal vertical plane through the dies 16 and 17. The operator, observing the screen 27, then advances the film strip 15, by turning either of the knobs 129, through the lateral passage 79 in the first section 69 of the die 16, so that the upper and lower edges of said film strip enters the opposing grooves 178 in the upper and lower retractable guides 175 and 176, respectively. Feeding of the film strip 15 is continued until said strip has passed along the guides 175, 176, and, hence, across the die opening or passage 18 in the die 16, and has at least partially entered the lateral passage 79 in the other section 67 of said die, as indicated in FIG. 9, and the image on the screen 27 indicates that the full image or picture on the frame of the strip to be cut out is in accurate register with the opening 18 through the die 16. In the event that the film strip 15 is advanced too far, as indicated on the screen 27, it may, of course, be retracted to bring the image or picture on the strip into accurate register with the dies simply by turning shaft 125 in the reverse direction. As shown in FIGS. 4 and 7, the punch 17 is formed with relatively thin outer walls, thus leaving a rectangular passage 38 of substantial size extending axially therethrough and through the flange 139, and communicating at the rear end thereof with a similar passage 43 of substantially the same size formed in and extending axially through the cross-head 137, to enable projection of the film-strip-images through said passages upon the screen 27.

Preferably the film feeding and image centering operations are carried out before the insertion of a card 10 into the apparatus, so that there is no possibility of partially obscuring the edges of the projected image by the card or by the border 12 on the card. Assuming that the projected image has been properly centered with respect to the die passage 18, as seen on the screen 27, the card 10 is then inserted edgewise into the correct position, as above described, with the adhesively coated surface of the border 12 facing the film strip 15 as shown in FIG. 11. With the retractable guides 175 and 176 still in their innermost film strip guiding positions, the operator then depresses the outer end of the handle 161, thereby causing the cross-head 137 to approach the die 16, and the punch 17 carried by said cross-head to move farther into said die. Before the forward end of the punch 17 reaches the retractable guides 175 and 176, the forward conical ends 190 of the pins 187 will have entered the passages 185 in the plungers 177, thereby raising and depressing the guides 175 and 176, respectively, so that they are completely removed from the path of the punch 17 and from engagement with the film strip 15. Immediately thereafter, the four corners of the film section to be cut from the film strip 15 are clampingly engaged between the outer elevated ends of the cutting edges 77 of the die 16 and the forward cutting edges of the blades 23 of the punch 17, thus preventing any movement or displacement of the film section out of proper registry with the dies.

Continued forward movement of the punch 17 causes the film section being cut to be moved forwardly and to be progressively sheared at its edges by cuts extending inwardly from the corners and lying along the planes of the cutting edges 77. The progressively cut edges of the film section lie forwardly of the outer ends of the cutting edges 77 which the cut film edges have passed, so that the film section is accurately guided at all times as it is being cut and as it travels in a forward direction. When the forward cutting edges of the blades 23 of the punch 17 have passed beyond the central, lowest points of the cutting edges 77, the film section 14 will have been entirely severed from the film strip 15. The severed film section 14 is then moved forwardly by the forward flat rectangular end of the punch 17, being guided by the upper and lower non-cutting inner surfaces of the die 16 and by the inner side surfaces of said die forwardly of the cutting edges 77. As the punch 17 approaches the end of its forward movement, the severed film section 14 will be introduced by said punch into the aperture 11 in the card 10, and will be firmly pressed by the punch into engagement with the adhesively coated border 12 around the aperture 11 on the card at the end of said movement. During such latter operation, the card 10 and the border 12 thereof are backed up by the transparent anvil member 56, as shown in FIG. 12. The accurate positioning of the rear bracket 130 by the stop means 135, 136, the accurate adjustment of the forward terminus of travel of the punch 17 by the extension arm 170 and the lower stop element 174, and the yieldable mounting of the anvil plate 56 afforded by the cushion ring 57, allow the severed film sections 14 to be pressed against the borders 12 of the cards 10 without danger of damaging said film sections, said borders or any elements of the apparatus. After the film section 14 has been thus mounted in the card 10, the handle 161 is released, whereupon the spring 169 restores the parts to the starting positions thereof shown in FIG. 4, determined by engagement of the extension arm 170 with the upper stop element 172. Retraction of the punch 17 to its original position releases the card 10 with the film section 14 mounted therein, and also releases the guides 175 and 176 for return movement by the springs 182 to their inner film strip receiving and guiding positions. Following the removal of the film mounted card 10 from the apparatus, the film strip 15 is again advanced to position the next image thereon in registry with the dies 16 and 17, a new card 10 is inserted into the apparatus, and the above described operations are repeated.

Although only one embodiment of the present invention has been illustrated in the accompanying drawings and described in the foregoing specification, it is to be understood that said invention is not limited to said embodiment or to the particular type of insert and card disclosed. Various changes may be made therein, particularly in the design and arrangements of the parts illustrated without departing from the spirit and scope of the invention as will now be clear to those skilled in the art.

What is claimed is:

1. In apparatus for cutting sections of a predetermined length from a supply strip of relatively thin flexible material and mounting said sections in rectangular apertures in cards, a fixed planar die having a rectangular opening therethrough of substantially the same width as that of the strip and the aperture in the card and substantially of the same length as that of said card aperture, the opposed edges of said die opening defining the length of said die opening being formed as cutting edges, a reciprocable punch arranged at one side of said die coaxially with said die opening and corresponding in transverse cross-section to the size and shape of said die opening, said punch having spaced cutting edges cooperating with the cutting edges of said die, means for advancing the strip between said die and said punch across said die opening and past said cutting edges, opposed movably mounted guides normally projecting into said die opening and extending across the latter substantially from cutting edge to cutting edge thereof to engage the opposed longitudinal edges of the strip and guide said strip for movement in the plane thereof across said die opening, means arranged at the opposite side of said die for supporting a card against facewise displacement away from said die and with the aperture in said card aligned with said die opening, means for operating said punch toward the strip to sever a section from said strip and move said section through said die opening into the aperture in the card, and means associated with said guides and said punch for moving said guides away from each other clear of the advanced and guided strip and clear of said die opening to enable movement of said punch past the cutting edges of said die and severance and mounting of the section in the card thereby.

2. An apparatus for cutting sections of a predetermined length from a supply strip of relatively thin flexible material and mounting said sections in rectangular apertures in cards, comprising cooperating stationary and movable dies between which the strip is advanced and each having two cutting edges extending across the path of movement of the strip and spaced longitudinally of said path, opposed guides located between the cutting edges of the stationary die so as to engage the opposed longitudinal edges of the strip and thereby guide said strip for movement in a straight-line path across the space between the cutting edges of said stationary die, means for supporting said card with the aperture therein in axial alignment with said stationary and movable dies, means for operating said movable die toward the strip to sever a section therefrom and to move said severed section through said stationary die and into the aperture in said card, and means associated with said guide and said movable die for moving said guides away from each other clear of the die opening to enable movement of said movable die past the cutting edges of said stationary die and severance and mounting of the section in the card thereby.

3. An apparatus for cutting sections of a predetermined length from a supply strip of relatively thin flexible material and mounting said sections in apertures in card-like members comprising a die member having a die opening therein and cutting edges on opposing sides of said opening, punch means located at one side of said die and operatively associated therewith opposed guides located between the cutting edges of the die so as to engage the opposed longitudinal edges of said strip and thereby to guide the leading end of said strip between the cutting edges of said die, card guide means located adjacent the other side of said die for supporting a card with the aperture therein in axial alignment with said die opening, means for reciprocally supporting said punch means in axial alignment with said die opening, means for applying pressure to said punch means for moving the same through said die opening, means associated with said guides and said punch for moving said guides away from each other clear of the die opening to enable movement of said punch means past the cutting edges of said die whereby a section of the strip is severed and mounted in the aperture of the card.

4. An apparatus for cutting sections of a predetermined length from a supply strip of relatively thin flexible material and mounting said sections in apertures in cards, comprising a die member having a die opening therein, a projector comprising a source of light and a condensing lens arranged at one end of said die member and in alignment with said die opening, reciprocable punch means located at one side of said die member and cooperating with said die opening for cutting a record bearing section from said strip and moving said cut section through said die opening into the aperture in a card, a light transmitting passage through said punch means, opposed guides located between the cutting edges of the die so as to engage the opposed longitudinal edges of the strip and thereby guide said strip for movement between the cutting edges of said die, card guide means located adjacent said die member for supporting a card edgewise and facewise with the aperture therein in axial alignment with said die opening, said card guide means including a translucent anvil plate having a plane surface and being adapted to engage the broad surface of the card remote from the die member at the location of the aperture in the card, means for operating said punch toward the strip to sever a section therefrom, and means associated with said guides and said punch means for moving said guides away from each other clear of the die opening to enable movement of said punch means past the cutting edges of said die and severance and mounting of the section in the card thereby.

5. An apparatus for cutting sections of a predetermined length from a supply strip of relatively thin flexible material and mounting said sections in apertures in card-like members comprising a die having an opening therein and cutting edges on opposing sides of said opening, punch means located at one side of said die and operatively associated therewith, opposed guides located between the cutting edges of the die to engage the opposed longitudinal edges of said strip and thereby to guide the leading end of said strip between the cutting edges of said die, a resiliently mounted transparent anvil plate spaced from the other side of said die and forming a slot therebetween, a horizontally extending ledge means positioned below said slot, means to move said ledge toward and away from said slot, a card receiving guide means adjacent one side of said slot and operatively associated with said ledge, an adjustable vertically extending stop means positioned adjacent the other side of said slot, means for moving said stop means and being operatively associated with said means for moving said ledge means, means for reciprocally moving said punch through said die, means for selectively limiting the punch movement through said die, and means to move said guides away from each other and out of the path of movement of the punch as said punch moves through said die.

6. An apparatus for cutting sections from a supply strip of relatively thin material and mounting the same in apertures in card-like members, comprising a die having an opening therethrough and cutting edges on the edges of said die on opposing sides of said opening, a hollow punch located at one side of said die and operatively associated with said die, opposed guides located between the cutting edges of said die to engage opposed longitudinal edges of said strip and thereby to guide the leading end of said strip between said cutting edges, a resiliently mounted transparent anvil plate positioned adjacent the other side of said die, card receiving and aligning means positioned between said anvil and said other end of the die whereby the aperture in a card is held in alignment with said die opening, means for reciprocally moving said punch through said die, means for selectively limiting the distance of movement of said punch whereby the pressure between the front surface of said punch and said anvil is controlled, and means to move said guides away from each other and out of the path of movement of the punch as said punch moves through said die.

7. An apparatus for cutting sections of a predetermined length from a supply strip of relatively thin flexible material and mounting the same in rectangular sections in cards, comprising a die member having an opening therein and cutting edges on opposing sides of said opening, punch means located at one side of said die and operatively associated therewith, opposed guides located between the cutting edges of said die to engage the opposed longitudinal edges of said strip and thereby guide the leading end of said strip between the cutting edges of said die, means to retain said guide means from moving in a plane normal to the plane of said die, means for supporting said card with the aperture therein in axial alignment with said die opening, means for moving said punch through said die member to sever a section from said strip and to move said severed section into a card aperture, and means to move said guides away from each other and out of the path of movement of the punch as it moves through said die.

8. An apparatus as defined in claim 7 comprising means to resiliently retain said guide means in operative position between the cutting edges of said die.

References Cited in the file of this patent

UNITED STATES PATENTS

| | | |
|---|---|---|
| 2,588,087 | Connor et al. | Mar. 4, 1952 |
| 2,591,519 | Decker | Apr. 1, 1952 |
| 2,642,786 | Baker | June 30, 1953 |